US012562444B2

(12) United States Patent
Kim et al.

(10) Patent No.: US 12,562,444 B2
(45) Date of Patent: Feb. 24, 2026

(54) RF FILTER ASSEMBLY COMPRISING MULTIPLE RF FILTERS MOUNTED ON A MAIN BOARD THROUGH A METAL MATERIAL FILTER SUPPORT MEMBER

(71) Applicant: KMW INC., Hwaseong-si (KR)

(72) Inventors: Joung Hoe Kim, Hwaseong-si (KR); Sang Yoong Kim, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 159 days.

(21) Appl. No.: 18/114,227

(22) Filed: Feb. 25, 2023

(65) Prior Publication Data

US 2023/0238675 A1 Jul. 27, 2023

Related U.S. Application Data

(63) Continuation of application No. PCT/KR2021/011335, filed on Aug. 25, 2021.

(30) Foreign Application Priority Data

Aug. 28, 2020 (KR) ........................ 10-2020-0109562
Aug. 24, 2021 (KR) ........................ 10-2021-0111452

(51) Int. Cl.
*H01P 1/205* (2006.01)
*H01P 1/207* (2006.01)

(52) U.S. Cl.
CPC ............ *H01P 1/2056* (2013.01); *H01P 1/207* (2013.01)

(58) Field of Classification Search
CPC ..................................................... H01P 1/2056
(Continued)

(56) References Cited

U.S. PATENT DOCUMENTS 4,692,726 A * 9/1987 Green et al. .......... H01P 1/2136
333/202
5,023,580 A * 6/1991 Kim et al. ........... H05K 1/0243
333/202
(Continued)

FOREIGN PATENT DOCUMENTS

CN 108448213 A 8/2018
CN 108808224 A 11/2018
(Continued)

OTHER PUBLICATIONS

Non-final Office Action mailed Mar. 31, 2023 from the Korean Intellectual Property Office for Korean Application No. 10-2021-0111452.

(Continued)

*Primary Examiner* — Benny T Lee
(74) *Attorney, Agent, or Firm* — Insight Law Group, PLLC; Seung Lee

(57) ABSTRACT

The present invention relates to an RF filter assembly for an antenna. Particularly, the RF filter assembly for an antenna comprises: a main board on which a plurality of electronic components are mounted; a plurality of RF filters which are installed on one surface of the main board; and a filter support member which is disposed between the main board and the plurality of RF filters, is made of a metal material, and separates each of the plurality of RF filters in the direction of the one surface of the main board. Thereby, the present invention provides advantages of preventing the occurrence of cracks in solder cream caused by differences in thermal expansion coefficients between the main board and each RF filter, and also, enabling a more precise RF filter arrangement, and improving product reliability.

12 Claims, 5 Drawing Sheets

(58) Field of Classification Search
USPC .......................................................... 333/206
See application file for complete search history.

(56) References Cited

U.S. PATENT DOCUMENTS

| | | | | |
|---|---|---|---|---|
| 5,130,682 | A * | 7/1992 | Agahi-Kesheh ...... | H01P 1/2056 333/202 |
| 2017/0354028 | A1 | 12/2017 | Nusseibeh | |
| 2018/0226946 | A1 | 8/2018 | Kim et al. | |

FOREIGN PATENT DOCUMENTS

| | | | |
|---|---|---|---|
| CN | 109952715 | A | 6/2019 |
| CN | 110380170 | A | 10/2019 |
| CN | 110739510 | A | 1/2020 |
| CN | 216818580 | U | 6/2022 |
| KR | 10-2001-0001955 | A | 1/2001 |
| KR | 10-1633643 | A | 7/2016 |
| KR | 10-2018-0055770 | A | 5/2018 |

OTHER PUBLICATIONS

International Search Report mailed Dec. 1, 2021 for International Application No. PCT/KR2021/011335 and its English translation.
Non-final Office Action mailed Jun. 10, 2025 from the Chinese Patent Office for Chinese Application No. 202180051936.5.

* cited by examiner

RF FILTER ASSEMBLY COMPRISING MULTIPLE RF FILTERS MOUNTED ON A MAIN BOARD THROUGH A METAL MATERIAL FILTER SUPPORT MEMBER

CROSS-REFERENCE TO RELATED APPLICATIONS

This application is a continuation application of International Application No. PCT/KR2021/011335, filed Aug. 25, 2021, which claims the benefit of Korean Patent Application Nos. 10-2020-0109562, filed Aug. 28, 2020; and 10-2021-0111452, filed Aug. 24, 2021, in the Korean Intellectual Property Office, the disclosures of which are incorporated herein in their entirety by reference.

TECHNICAL FIELD

The present disclosure relates to a radio frequency filter assembly for an antenna, and more particularly, to an RF filter assembly for an antenna, which can minimize a solder coupling area and prevent the occurrence of an electrical short phenomenon.

Background Art

In order to satisfy wireless data traffic demands that tend to increase after 4G ($4^{th}$ generation) communication system commercialization, efforts to develop an enhanced 5G ($5^{th}$ generation) communication system or a pre-5G communication system are being made. For this reason, the 5G communication system or the pre-5G communication system is called a beyond 4G network communication system or a post long term evolution (LTE) system.

In order to achieve a high data transfer rate, in the 5G communication system, communication using a mmWave band is taken into consideration. In order to reduce a path loss of a radio wave and increase the transfer distance of a radio wave in the mmWave band, beamforming, massive MIMO, full dimensional MIMO (FD-MIMO), array antenna, analog beamforming, and large scale antenna technologies have been discussed in the 5G communication system.

In particular, the array antenna technology is an element array technology in which multiple filters, that is, one of the antenna elements, and an antenna device need to be intensively mounted on the entire surface of a main board having one board form and which physically requires a high degree of accuracy for an impedance matching design between multiple reception channels and transmission channels. Recently, in the 5G communication system market, a demand for a ceramic waveguide filter which facilitates a frequency filtering design and can be easily fabricated, among the array antennas, tends to increase. A mass production technology for supply in accordance with a demand for the ceramic waveguide filter is required.

FIG. 1 is a schematic cross-sectional view illustrating an example of a form in which a filter, among components of an RF filter assembly for an antenna according to a conventional technology, has been mounted on a main board.

The RF filter assembly 1 for an antenna according to a conventional technology has one board form as illustrated in FIG. 1. An RF filter 20 is coupled to one surface of a main board 10 provided as a predetermined material through the medium of a board for fixing 5. In this case, the board for fixing 5 is formed of an FR4 material, and performs a role to separate the RF filter 20 from one surface of the main board 10 at a predetermined distance in order to prevent a phenomenon in which the short (short-circuit) of an electrical signal occurs upon direct contact and coupling between the main board 10 and the RF filter 20.

Multiple RF filters 20 provided as a ceramic material are mounted in a lump by using a method (i.e., an SMT method) of previously applying solder cream 30 on one surface of the board for fixing 5 at a predetermined thickness, then precisely arranging the devices of the multiple RF filters 20, and dissolving the solder cream 30 by applying predetermined heat. In mounting the RF filter 20, in general, the solder cream 30 is thickly formed in order to prevent a short failure under a part.

However, a crack occurs at a predetermined portion of the solder cream 30 that is disposed between the board for fixing 5 and the RF filter 20 due to the generation of system heat within an antenna housing body (not illustrated) in which the RF filter assembly 1 for an antenna according to a conventional technology is installed, because of a difference in the coefficient of expansion (e.g., the coefficient of expansion of the board for fixing 5 is 17 ppm/° C., and the coefficient of expansion of the RF filter that is the ceramic material is 8.2 ppm/° C.) between the board for fixing 5, that is, the FR4 material, and the RF filter, that is, the ceramic material. The crack becomes a major cause of an antenna failure.

That is, if a crack occurs between the board for fixing 5 and the RF filter 20, there is a problem in that performance of an antenna deteriorates because a phenomenon in which the RF filters 20 are physically separated and detached and a phenomenon in which a silver plating layer metalized in the periphery of the RF filter 20 is peeled off occur.

Furthermore, the occurrence of a crack also affects the deterioration of performance at an input/output port (not illustrated) portion of the RF filter 20, and may cause performance deterioration in terms of isolation between the RF filters 20 due to the leakage of a signal at a portion that serves as a GND.

DISCLOSURE

Technical Problem

The present disclosure has been made to solve the problems, and an object of the present disclosure is to provide an RF filter assembly for an antenna, which can minimize a solder area that connects a main board and multiple RF filters and reduce the amount of a solder.

Moreover, another object of the present disclosure is to provide an RF filter assembly for an antenna, which can prevent the occurrence of an electrical short by separating multiple RF filters from one surface of the main board at a predetermined distance.

Furthermore, still another object of the present disclosure is to provide an RF filter assembly for an antenna, which can secure reliability by enabling the devices of multiple RF filters to be arranged on one surface of the main board uniformly and precisely.

Objects of the present disclosure are not limited to the aforementioned objects, and other objects not described above may be evidently understood by those skilled in the art from the following description.

Technical Solution

An RF filter assembly for an antenna according to an embodiment of the present disclosure includes multiple RF filters installed on one surface of a main board on which multiple electronic parts are mounted, and a filter support member disposed between the main board and the multiple RF filters, made of a metal material, and configured to separate each of the multiple, RF filters from the one surface of the main board.

In this case, the filter support member may include a filter body support part formed in accordance with a shape of an end that belongs to an outward appearance of each of the multiple RF filters and that is close to a side of the main board, except a part of the filter body support part.

Furthermore, the filter support member may further include a filter port support part provided within the filter body support part in a way to be separated from the filter body support part and configured to separate and support input/output port portions of power feed signals for the multiple RF filters with respect to the main board.

Furthermore, the filter port support part may be provided in an inside of the filter body support part, which corresponds to the excepted part of the filter body support part.

Furthermore, the filter body support part and the filter port support part may separate the multiple RF filters at an identical height.

Furthermore, the filter body support part may include a one-side incision groove part and the other-side incision groove part that are incised and formed from the end of an edge of the filter body support part on one side thereof and the end of an edge of the filter body support part on the other side thereof to a portion where the filter port support part has been disposed.

Furthermore, the filter body support part may include a support plate part attached to the one surface of the main board in a surface form, an edge support stage bent from the end of an edge of the support plate part toward each of the multiple RF filters, and at least one inside support stage formed by bending a part of the support part corresponding to an inside of the edge support stage and configured to support opposing surfaces of each of the multiple RF filters.

Furthermore, an outward appearance of the support plate part may be formed in a shape identical with a shape that is obtained by subtracting shapes of the one-side incision groove part and the other-side incision groove part from an outward appearance of the opposing surface of the RF filter.

Furthermore; the edge support stage may be formed in a shape in which a concave part and a convex part are repeated along an end of an edge of the edge support stage.

Furthermore, the at least one inside support stage may include a first bent part that is formed by incising a part of the support plate part in a "⊏" shape and in which a portion connected to the support plate part is bent in a direction in which the multiple RF filters are provided, and a second bent part that is bent in parallel to opposing surfaces of the multiple RF filters from the end of the first bent part.

Furthermore, the multiple RF filters may be provided as ceramic waveguide filters. The filter port support part may be provided at a location corresponding to an input port hole to which an input port of the ceramic waveguide filter is connected and an output port hole to which an output port of the ceramic waveguide filter is connected.

Furthermore, the multiple RF filters may be provided as ceramic waveguide filters and may be coupled by a solder at a contact point between the RF filter, and the filter body support part and the filter port support part.

Furthermore, the filter support member may be made of the metal material different from a material of the multiple RF filters and a material of the main board, and may include any one of steel, stainless steel (SUS), and Cu materials.

Advantageous Effects

In accordance with an embodiment of the RF filter assembly for an antenna according to the present disclosure, the following various effects can be achieved.

First, there is an effect in that the occurrence of a crack in the solder cream attributable to the generation of system heat can be minimized by minimizing the solder area that connects the main board and the multiple RF filters and the amount of a solder so that the solder cream can be formed at a thin thickness.

Furthermore, there is an effect in that stress occurring due to thermal expansion between the RF filters and the main board can be reduced while stretching the filter support member made of a metal material upon thermal expansion.

Moreover, the present disclosure has an effect in that a stable signal flow can be guaranteed by preventing an electrical short from occurring by separating multiple RF filters from one surface of the main board at a predetermined distance.

Furthermore, the present disclosure has an effect in that reliability of a product can be improved by enabling the devices of the multiple RF filters to be arranged on one surface of the main board uniformly and precisely.

Figure 1:
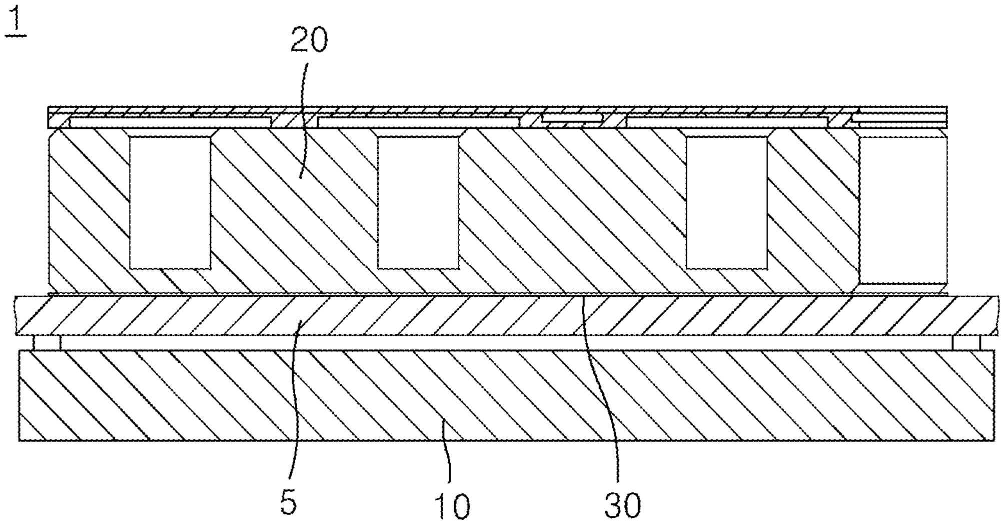
FIG. 1 (PRIOR ART)
FIG. 1 is a schematic cross-sectional view illustrating an example of a form in which a filter, among components of an RF filter assembly for an antenna according to a conventional technology, has been mounted on a main board.

100: RF filter assembly for antenna 110: main board
120: RF filter (ceramic waveguide filter) 121: filter body
122: resonator post 123: cover for tuning
124: engraving pad 125: filter cover
140: filter support member 142: filter body support part
143: filter port support part 144: edge support stage
144*a*: concave part 144*b*: convex part
145: inside support stage 145*a*: first bent part
145*b*: second bent part 146*a*: one-side incision groove part
146*b*: the other-side incision groove part 147: straight-line slot part
148: circular slot part

BEST MODE

Hereinafter, an embodiment of an RF filter assembly for an antenna according to the present disclosure is described in detail with reference to the accompanying drawings.

In adding reference numerals to the components of each drawing, it should be noted that the same components have the same reference numerals as much as possible even if they are displayed in different drawings. Furthermore, in describing embodiments of the present disclosure, when it is determined that the detailed description of the related well-known configuration or function may obscure the gist of the present disclosure, the detailed description thereof will be omitted.

In describing components of an embodiment of the present disclosure, terms, such as a first, a second, A, B, (a), and (b), may be used. Such terms are used only to distinguish one component from another component, and the essence, order, or sequence of a corresponding component is not limited by the terms. All terms used herein, including technical or scientific terms, have the same meanings as those commonly understood by a person having ordinary knowledge in the art to which the present disclosure pertains, unless defined otherwise in the specification. Terms, such as those commonly used and defined in dictionaries, should be construed as having the same meanings as those in the context of a related technology, and are not construed as having an ideal meaning or an excessively formal meaning unless explicitly defined otherwise in the specification.

Figure 2A:
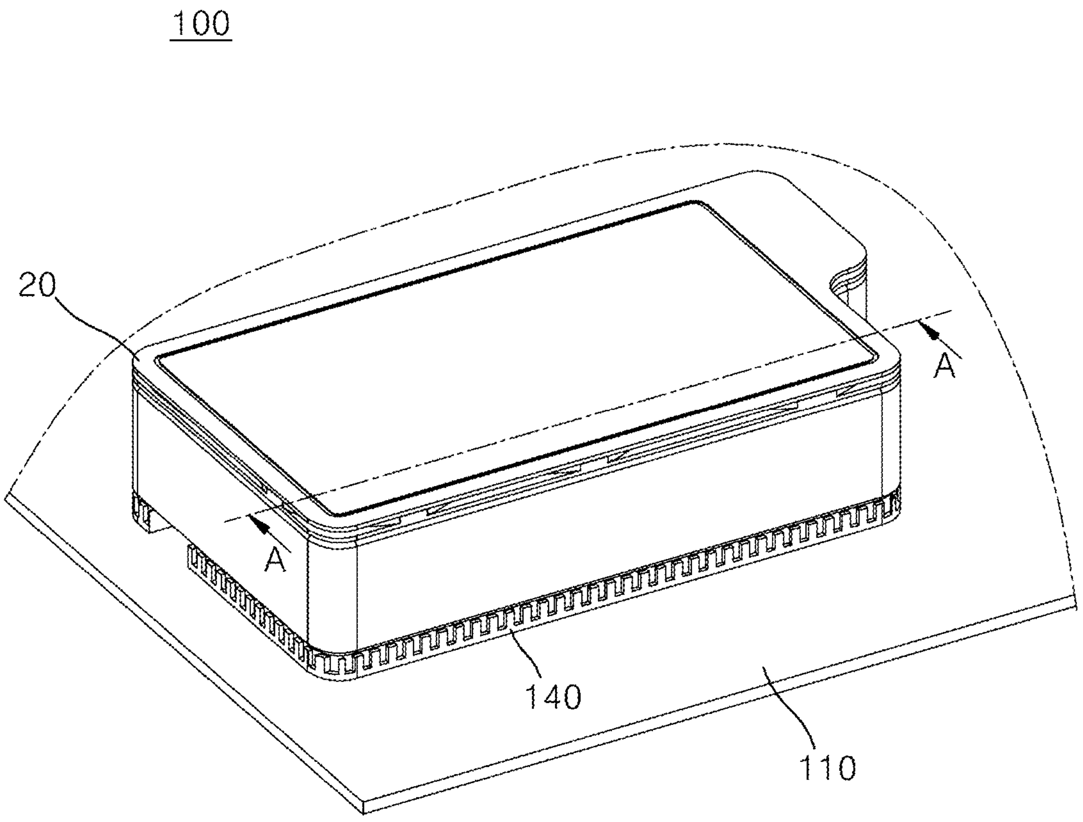
FIGS. 2A and 2B are a downward perspective view and upward perspective view of an RF filter assembly for an antenna according to an embodiment of the present disclosure.
Figure 2B:
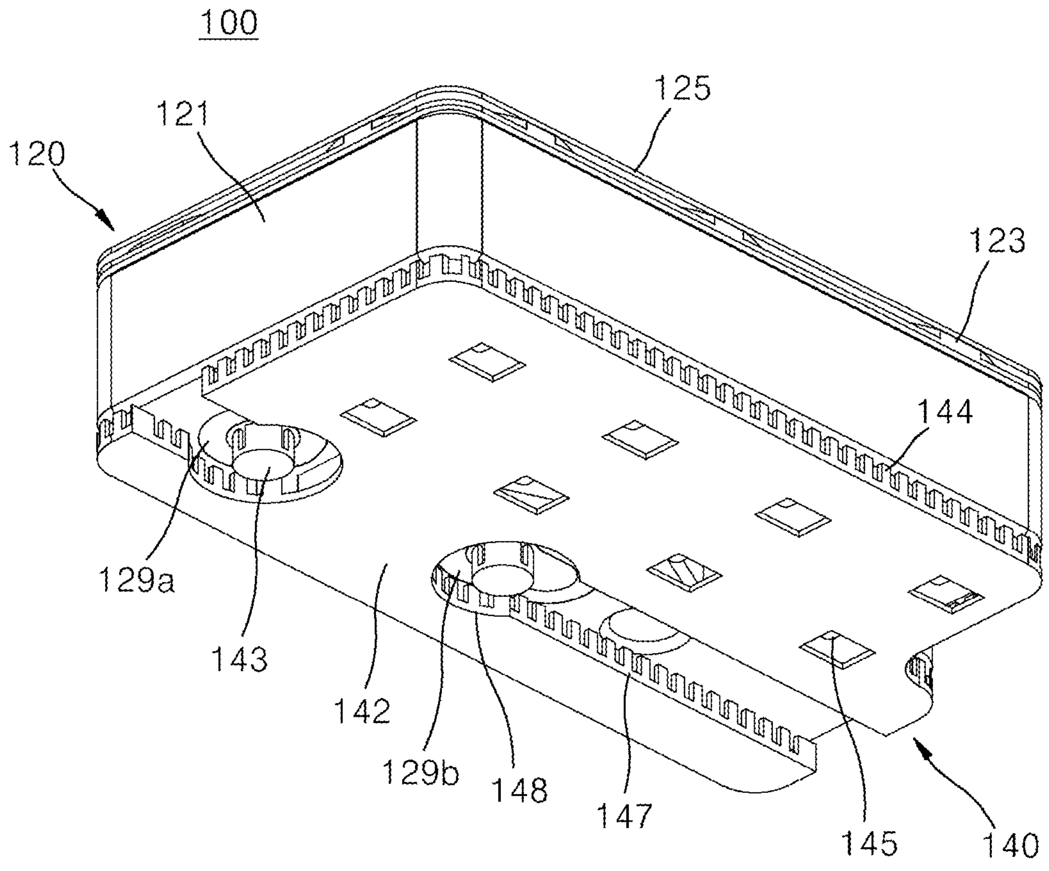
Figure 3:
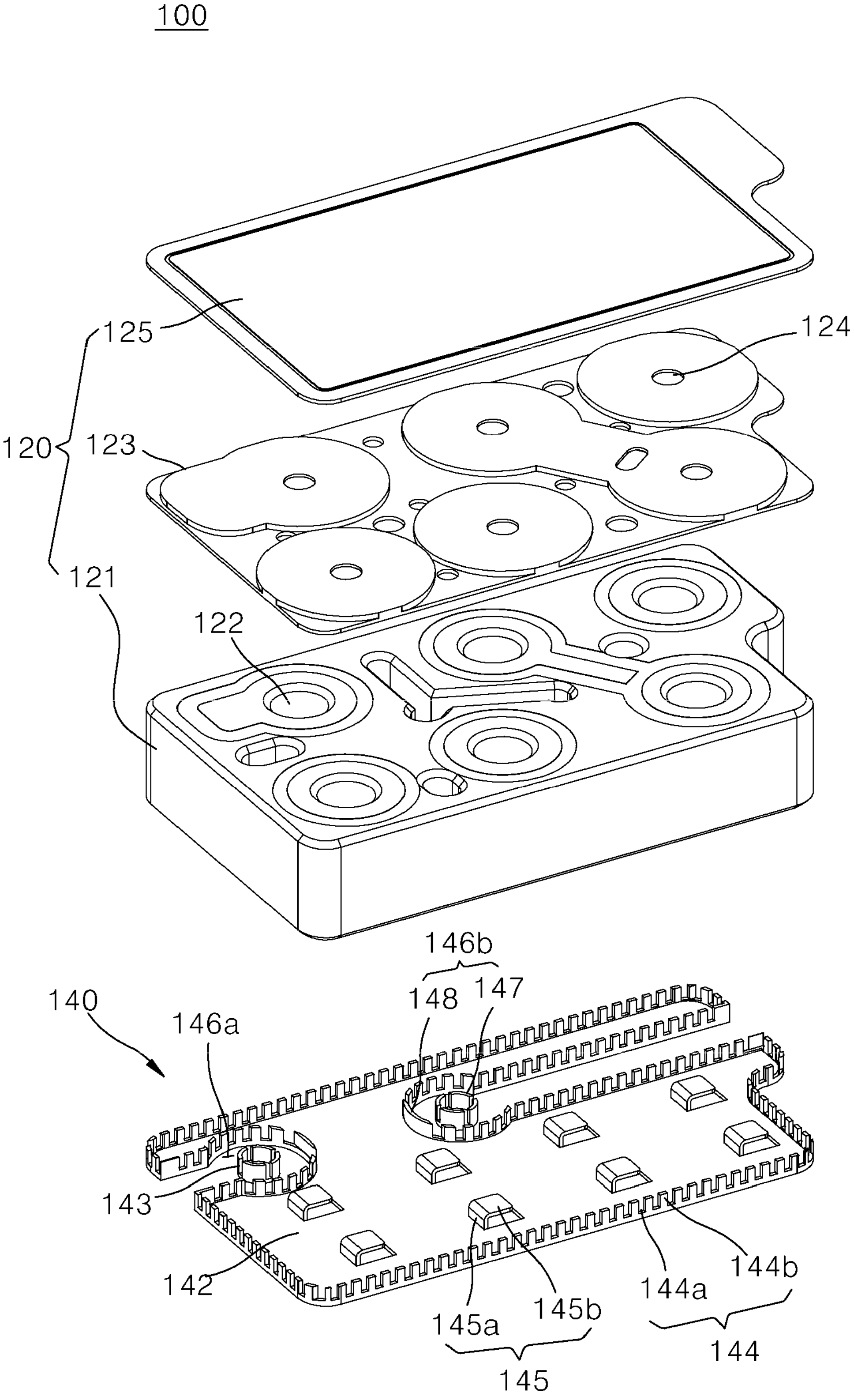
FIG. 3 is an exploded perspective view of the RF filter assembly for an antenna according to an embodiment of the present disclosure.
Figure 4:
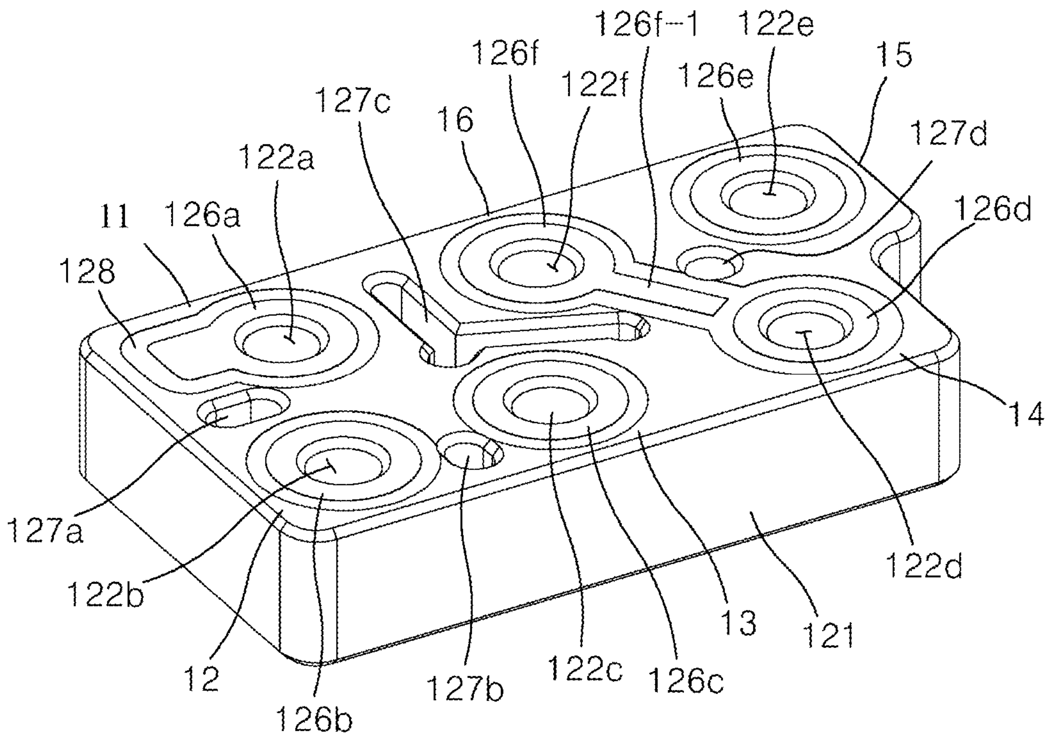
FIG. 4 is a perspective view illustrating an RF filter among the components of FIG. 3.

FIGS. 2A and 2B are a downward perspective view and upward perspective view of an RF filter assembly for an antenna according to an embodiment of the present disclosure. FIG. 3 is an exploded perspective view of the RF filter assembly for an antenna according to an embodiment of the present disclosure. FIG. 4 is a perspective view illustrating an RF filter among the components of FIG. 3.

The RF filter assembly 100 for an antenna according to an embodiment of the present disclosure includes a main board 110, multiple RF filters 120, and a filter support member 140, as referenced in FIGS. 2A to 4.

The main board 110 is a printed circuit board (PCB) having one board form. The multiple RF filters 120 or some of electronic parts for being tuned with the multiple RF filters 120 may be mounted on one surface of the main board. Multiple electronic parts that are provided as multiple power feed-related parts capable of controlling calibration power feed toward the multiple RF filters 120 may be mounted on the other surface of the main board.

In an embodiment of the present disclosure, for the convenience of understanding, a single RF filter 120 has been illustrated and described as being provided in a single filter support member 140 on the other surface (a top in FIG. 2A) of the main board 110 that is provided as the PCB having one board form. However, the filter support member 140 is formed to have a unique shape according to a location at which some or all of the multiple RF filters 120 have been disposed, but does not exclude a shape in which the filter support members 140 are stacked and disposed at multiple places of the entire other surface of the main board 110.

In this case, the RF filter 120 is provided as a ceramic waveguide filter. The multiple RF filters 120 may be mounted and arranged on one surface of the main board 110 at predetermined intervals through the medium of the at least one filter support member 140.

As referenced in FIGS. 3 and 4, the RF filter 120 that has been adopted as the ceramic waveguide filter includes a filter body 121 made of a ceramic material and at least four resonant blocks provided in the filter body 121. A corresponding resonator post 122 is installed in each of the resonant blocks. Each resonator post 122 may filter a frequency signal through adjacent coupling with an adjacent resonator post 122 or through cross coupling in which a resonator post is coupled to another resonator post by skipping at least one resonator post.

In this case, resonant blocks 11 to 16 formed in the filter body 121 do not need to be physically separated fully, and are only required to be distinguished from one another based on a change in the transmission path width of a signal by barrier ribs that are provided in the filter body 121.

For example, as referenced in FIG. 4, six resonator posts **122*a* to 122*f* are provided in the filter body 121. When an electrical signal is input through an input port hole 129*a* described later, the electrical signal is applied through the first resonator post 122*a* that is closest to the input port hole 129*a*. After frequency filtering is sequentially performed on the electrical signal via the second resonator post 122*b*-the third resonator post 122*c*-the fourth resonator post 122*d*-the fifth resonator post 122*e*-the sixth resonator post 122*f*, the electrical signal is output through an output port hole 129*b***.

In this case, a first barrier rib **127*a* is provided, between the first resonator post 122*a* and the second resonator post 122*b*, and divides the first resonant block 11 and the second resonant block 12. A second barrier rib 127*b* is provided between the second resonator post 122*b* and the third resonator post 122*c*, and divides the second resonant block 12 and the third resonant block 13. A part of a third barrier rib 127*c* is provided between the third resonator post 122*c* and the fourth resonator post 122*d*, and divides the third resonant block 13 and the fourth resonant block 14. A fourth barrier rib 127*d* is provided between the fourth resonator post 122*d* and the fifth resonator post 122*e*, and divides the fourth resonant block 14 and the fifth resonant block 15. The remaining part of the third barrier rib 127*c* is provided between the fifth resonator post 122*e* and the sixth resonator post 122*f*, and divides the fifth resonant block 15 and the sixth resonant block 16. In particular, the third barrier rib 127*c* is provided between the first resonator post 122*a*, the third resonator post 122*c*, and the sixth resonator post 122*f*, and may perform a role to physically divide three resonant blocks (the first resonant block 11, the third resonant block 13, and the sixth resonant block 16**) simultaneously.

Each of the first barrier rib **127*a* to the fourth barrier rib 127*d* may be formed to have a predetermined size that vertically penetrates the filter body 121**.

An outer cover of the filter body 121 may be plated with a film of a metallic material. A flow of an electrical signal into the inside and outside of the filter body 121 except the input port hole **129*a* or the output port hole 129*b*** described later may be blocked.

It is preferred that the resonant blocks provided in the filter body 121 are at least four resonant blocks as described above in order to perform filtering by the adjacent coupling or cross coupling of an electrical signal that flows through an input port or an output port not illustrated. In an embodiment of the present disclosure, an example in which the filter body 121 includes the six resonant blocks 11 to 16 is described.

That is, in the RF filter assembly 100 for an antenna according to an embodiment of the present disclosure, the ceramic waveguide filter has the six resonant blocks 11 to 16 provided in one filter body 121. Each of the resonator posts **122*a* to 122*f* of the respective resonant blocks 11 to 16 may be installed in a form in which a dielectric material having a predetermined dielectric constant is filled and fixed. In this case, since the air is also one of dielectric materials, a separate filling and fixing process is not required if the air is adopted and filled as the dielectric material that constitutes the resonator posts 122*a* to 122*f*. Accordingly, each of the six resonator posts 122*a* to 122*f* may be formed in an empty space form in which a part of the dielectric material has been removed from the filter body 121**.

In this case, as referenced in FIG. 4, film parts 126*a* to 126*f* of a conductive material may be plated and formed on internal surfaces of the resonator posts 122*a* to 122*f* and parts of one surface of the filter body 121, which correspond to edge portions of the resonator posts 122*a* to 122*f* at the top thereof. Some of the film parts 126*a* to 126*f* may further include a film extension stage 126*f*-1 that has been further extended and formed toward a related resonator post 126*d* so that cross coupling can be easily implemented between some resonator posts among the resonator posts 122*a* to 122*f*.

In an embodiment of the present disclosure, the film extension stage 126*f*-1 is provided between the fourth resonator post 122*d* and the sixth resonator post 122*f* by skipping the one fifth resonator post 122*e* so that cross coupling can be implemented. The film extension stage 126*f*-1 may be extended from the film part 126*f* formed in the sixth resonator post 122*f* toward the film part 126*d* of the fourth resonator post 122*d* on the one surface of the filter body 121 so that the cross coupling can be more easily implemented.

Moreover, referring to FIG. 4, a ground part 128 in which any film plating layer is not formed may be provided around each of the film parts 126*a* to 126*f*. The ground part 128 may play a role as the ground that insulates a portion that has been plated on an external surface of the filter body 121 in a film form and each of the film parts 126*a* to 126*f* of the resonator posts 122*a* to 122*f*.

Meanwhile, although not illustrated, the input port hole 129*a* for the connection of the input port (not illustrated) that inputs an electrical signal to any one of the six resonator posts 122 and the output port hole 129*b* for the connection of the output port (not illustrated) that outputs an electrical signal from any one of the six resonator posts 122 may be formed on the other surface of the ceramic waveguide filter. The input port and the output port that have been connected to the main board 110 through the medium of the filter port support part 143, among components of the filter support member 140 described later, may be installed in the input port hole 129*a* and the output port hole 129*b*.

Moreover, as referenced in FIG. 3, the ceramic waveguide filter may further include a cover for tuning 123 installed on an opened one side of each of the resonator posts 122 and provided to perform frequency tuning through an engraving method, a tuning screw, etc. and a filter cover 125 coupled to the one surface of the filter body 121 including the covers for tuning 123 so that the filter cover 125 covers the one surface.

If the frequency tuning method is the engraving method, an engraving pad 124 may be integrally formed in the cover for tuning 123. The engraving pads 124 may be spaced apart from one another and disposed at locations corresponding to the resonator posts 122, and are engraved by using an engraving tool not illustrated. Accordingly, frequency tuning can be performed by finely adjusting a separation distance between the engraving pad and the bottom of the resonator post 122.

Meanwhile, as referenced in FIGS. 2A to 3, the filter support member 140 is disposed between the main board 110 and the multiple RF filters 120, and may perform a role to separate the multiple RF filters 120 in the direction of the one surface of the main board 110. Moreover, the filter support member 140 is fixed to the one surface of the main board 110 through various coupling methods other than a soldering coupling method and also coupled to the multiple RF filters 120 through a soldering coupling method, and performs a role to mediate the coupling of the RF filter 120 with the main board 110.

The filter support member 140 is generally made of a metal material that is different from the material of the multiple RF filters 120 and the material of the main board 110, and may include any one of steel, stainless steel (SUS), and Cu materials. As the filter support member 140 is made of the metal material, there is an advantage in that a difference in the coefficient of expansion between pieces of solder cream that mediates the coupling of the filter body 121 can be minimized.

Figure 5:
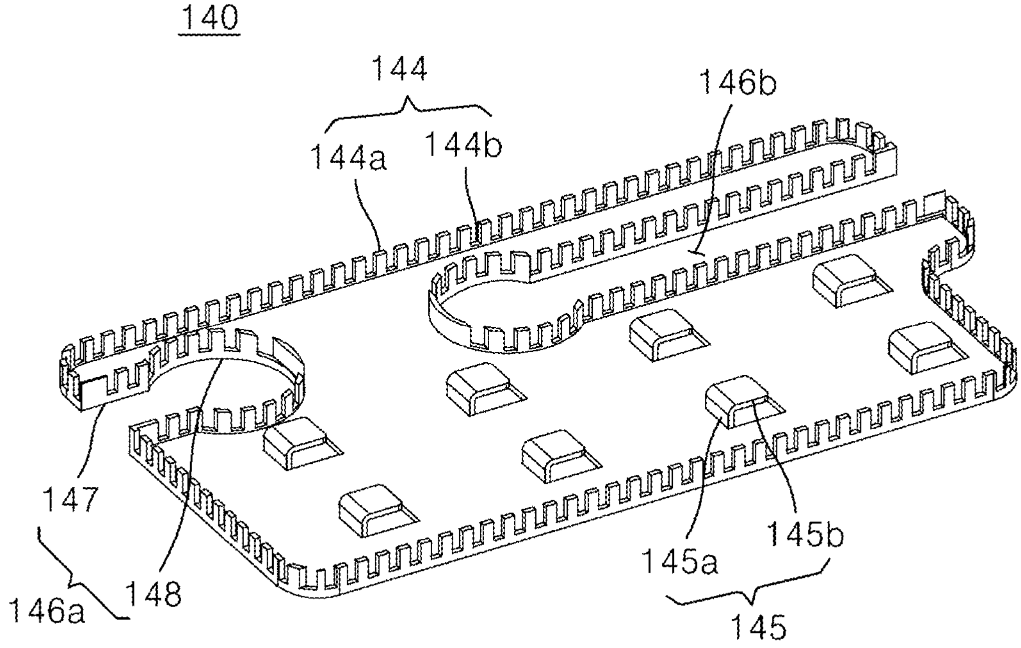
FIG. 5 is a perspective view illustrating a filter support member among the components of FIG. 3.
Figure 6:
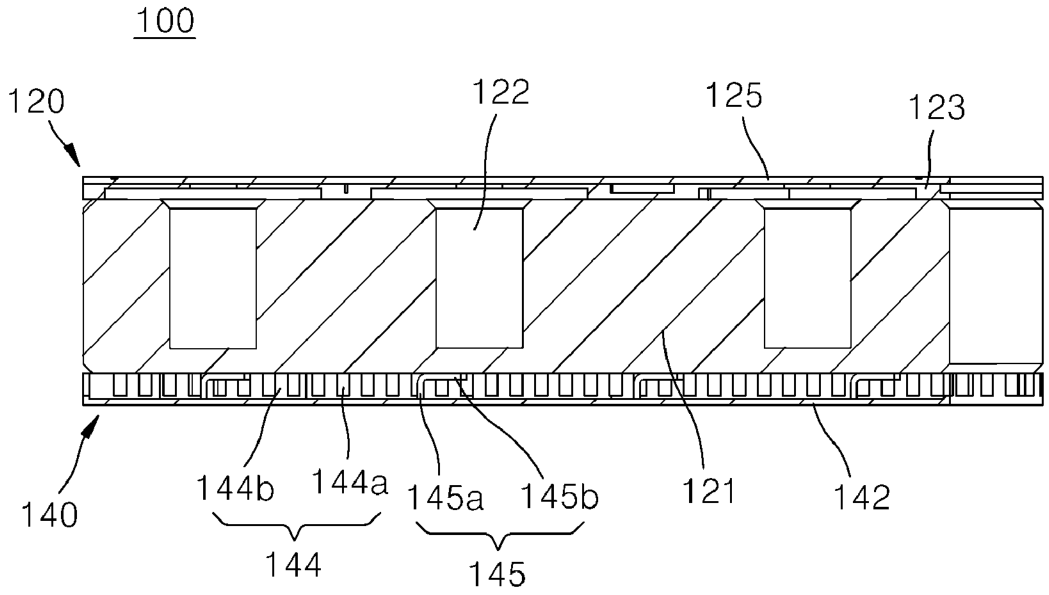
FIG. 6 is a cross-sectional view taken along line A-A in FIG. 2A.

FIG. 5 is a perspective view illustrating the filter support member among the components of FIG. 3. FIG. 6 is a cross-sectional view taken along line A-A in FIG. 2A.

Referring to FIGS. 3 and 5, the filter support member 140 may include a filter body support part 142 formed in accordance with a shape of an end that belongs to an outward appearance of each of the multiple RF filters 120 and that is close to the side of the main board 110, except a part of the filter body support part 120, and a filter port support part 143 that is provided within the filter body support part 142 in a way to be separated from the filter body support part 142 and that separates and supports input/output port portions of power feed signals for the multiple RF filters 120 with respect to the main board 110. In this case, the filter port support part 143 may be provided as a pair so that the pair of filter port support parts corresponds to the input port hole 129*a* and the output port hole 129*b* that have been formed in each RF filter 120.

The filter body support part 142 and the filter port support part 143 may separate the multiple RF filters 120 at the same height. This is more specifically described later.

As referenced in FIGS. 3 and 5, the filter body support part 142 may be incised and formed from the end of an edge of the filter body support part on one side thereof and the end of an edge of the filter body support part on the other side thereof to a portion where the filter port support part 143 has been disposed in order to separate and install the pair of filter port support parts 143.

More specifically, as referenced in FIGS. 3 and 5, if the ceramic waveguide filter is formed in a shape of a rectangular parallelepiped that is lengthily formed in a length direction thereof approximately, the filter body support part 142 may be formed in the form of a panel corresponding to one surface or the other surface of the ceramic waveguide filter.

In this case, as referenced in FIG. 3, the pair of filter port support parts 143 is disposed within the filter body support part 142 so that the filter port support parts do not mutually interfere with each other without being electrically connected to the filter body support part 142. The filter body support part 142 may include a one-side incision groove part 146*a* that is incised and formed from the end of an edge of the filter body support part on one side thereof, that is, an end in a length direction thereof, to a portion where one filter port support part 143 is disposed and the other-side incision groove part 146*b* that is incised and formed from the end of an edge of the filter body support part on the other side thereof, that is, the other end in the length direction thereof, to a portion where the other filter port support part 143 is disposed.

A straight-line slot part 147 having the same width up to a portion where each of the pair of filter port support parts 143 is disposed may be formed in each of the one-side incision groove part 146*a* and the other-side incision groove part 146*b*. A circular slot part 148 having a diameter greater than the width of the end of the straight-line slot part 147 may be formed in a portion that belongs to each of the one-side incision groove part 146*a* and the other-side incision groove part 146*b* and where each of the pair of filter port support parts 143 is disposed.

The straight-line slot part 147 is a signal line pattern that has been previously printed on the main board 110 although not illustrated, and may perform a role to shield, from external noise, electrical signals that flow through the input port and the output port.

The circular slot part 148 may perform a role to stabilize a flow of an electrical signal that is connected to each ceramic waveguide filter through the input port and the output port.

Meanwhile, as referenced in FIGS. 3 and 5, the filter body support part 142 may include a support plate part 142*a* a surface of which is attached to the one surface of the main board 110, an edge support stage 144 that is bent from the end of the edge of the support plate part 142*a* toward each of the multiple RF filters 120 (i.e., the ceramic waveguide filter), and at least one inside support stage 145 that is formed by bending a part of the support plate part 142*a* corresponding to the inside of the edge support stage 144 and that supports an opposing surface of each of the ceramic waveguide filters.

In this case, an outward appearance of the support plate part 142*a* may be approximately formed in the same shape as a shape that is obtained by subtracting shapes of the one-side incision groove part 146*a* and the other-side incision groove part 146*b* from an outward appearance of the opposing surface of the ceramic waveguide filter as described above.

Furthermore, the edge support stage 144 is formed along the end of an outside edge of the support plate part 142*a*, and may be bent at a right angle and formed from the end of the outside edge of the support plate part 142*a* toward the ceramic waveguide filter.

The edge support stage 144 may be formed in a concave-convex part shape in which a concave part 144*a* and a convex part 144*b* are repeated along the end of the outside edge of the support plate part 142*a*. This is for minimizing a solder coupling area for the opposing surface of the ceramic waveguide filter by incised portions of the concave parts 144*a* of the edge support stage 144 and also stably supporting and separating the opposing surfaces of the ceramic waveguide filters by protruded portions of the convex parts 144*b* of the edge support stage 144.

Meanwhile, the at least one inside support stage 145 may include a first bent part 145*a* that is formed by incising a part of the support plate part 142*a* in a "⊏" shape and in which a portion connected to the support plate part 142*a* is bent in a direction in which the multiple RF filters 120 (i.e., the ceramic waveguide filters) are provided, and a second bent part 145*b* that is bent in parallel to the opposing surfaces of the multiple RF filters 120 (i.e., the ceramic waveguide filters) from the end of the first bent part 145*a*.

The first bent part 145*a* may perform a role to separate the ceramic waveguide filter from one surface (or the one surface of the main board 110) of the support plate part 142*a* at a predetermined distance. The second bent part 145*b* may perform a role to support the opposing surfaces of the ceramic waveguide filters that have been separated by the first bent part 145*a*.

As described above, an edge portion of the opposing surface of the ceramic waveguide filter can be uniformly supported by using the edge support stage 144 of the filter body support part 142. Furthermore, an inside that belongs to the opposing surface of the ceramic waveguide filter and that is not supported by the edge support stage 144 can be uniformly supported at a plurality of places by using the inside support stage 145 of the filter body support part 142.

Meanwhile, like the edge support stage 144 of the filter body support part 142, the filter port support part 143 may be formed in a shape in which the concave part 144*a* and the convex part 144*b* are repeated.

In this case, it is preferred that the ends of the edge support stage 144 and inside support stage 145 of the filter body support part 142 and the end of the filter port support part 143 are formed at the same height from the one surface of the main board 110 (or one surface of the support plate). This is for making uniform the heights of the ceramic waveguide filters that are supported and separated by the filter body support part 142 and the filter port support part 143.

Solder cream not illustrated may be applied on the ends of the filter body support part 142 and the filter port support part 143 at a predetermined thickness. The ceramic waveguide filter, and the ends of the filter body support part and the filter port support part may be coupled by a solder at a contact point at which the ends of the filter body support part 142 and the filter port support part come into contact with the opposing surface of the ceramic waveguide filter.

That is, the solder cream is a component for mutually coupling the filter support member 140 and the ceramic waveguide filter through a soldering coupling method. The solder cream is not applied on the entire area of the filter body support part 142 and the filter port support part 143, but may be applied on each of the ends of the edge support stage 144 and inside support stage 145 of the filter body support part 142 and the end of the filter port support part 143 as described above.

In this case, there is an advantage in that the solder area can be relatively minimized compared to a case in which the solder cream is applied on the entire area of the filter support member 140. Furthermore, the solder cream can be formed at a thin thickness by minimizing the amount of a solder. As described above, since the solder area on which the solder cream is applied is minimized and the solder cream is formed at a thin thickness, there is an advantage in that the possibility that a crack may occur in the solder cream and the amount of cracks occurred can be significantly reduced although a difference in the coefficient of expansion between the filter support member 140 and the ceramic waveguide filter is great.

More specifically, the solder cream has a form in which the solder cream is not applied on the support plate part 142*a* of the filter body support part 142, among the components of the filter support member 140. The solder cream may be point-applied on the end of the edge support stage 144, among the components of the filter body support part 142, and may be surface-applied on only one surface of the end of the inside support stage 145 (i.e., the second bent part 145*b*), among the components of the filter body support part 142. Moreover, the solder cream may be point-applied on the end of the filter port support part 143, among the components of the filter support member 140.

As described above, since the solder area on which the solder cream is applied can be minimized compared to the solder area of the RF filter 120 for one surface of the main board 110 conventionally, there are effects in that a problem attributable to a crack in the solder cream can be prevented and stress occurring due to thermal expansion between the RF filter 120 and the main board 110 is reduced as the filter support member 140 made of the metal material is stretched upon thermal expansion.

The RF filter assembly for an antenna according to an embodiment of the present disclosure has been described in detail with reference to the accompanying drawings. However, an embodiment of the present disclosure is not essentially limited to the aforementioned embodiment, and may include various modifications and implementations within an equivalent range thereof by a person having ordinary knowledge in the art to which the present disclosure pertains. Accordingly, the true range of a right of the present disclosure will be said to be defined by the appended claims.

INDUSTRIAL APPLICABILITY

The present disclosure provides the RF filter assembly for an antenna, which can minimize the solder area that connects the main board and the multiple RF filters, can reduce the amount of a solder, can prevent the occurrence of an electrical short by separating the multiple RF filters from one surface of the main board at a predetermined distance, and can secure reliability by enabling the devices of the multiple RF filters to be uniformly and precisely arranged on the one surface of the main board.

The invention claimed is:

1. An RF filter assembly for an antenna, comprising:

multiple RF filters installed on one surface of a main board on which multiple electronic parts are mounted; and a filter support member disposed between the main board and the multiple RF filters, made of a metal material, and configured to separate each of the multiple RF filters from the one surface of the main board, wherein the filter support member is made of the metal material different from a material of the multiple RF filters and a material of the main board, and comprises any one of steel, stainless steel (SUS), and Cu materials.

2. The RF filter assembly of claim 1, wherein the filter support member comprises a filter body support part formed in accordance with a shape of an end that belongs to an outward appearance of each of the multiple RF filters and that is close to a side of the main board, excluding a part of the filter body support part that corresponds to regions for accommodating a filter port support part.

3. The RF filter assembly of claim 2, wherein the filter support member further comprises the filter port support part provided within the filter body support part in a way to be separated from the filter body support part and configured to separate and support input/output port portions of power feed signals for the multiple RF filters with respect to the main board.

4. The RF filter assembly of claim 3, wherein the filter port support part is provided in an inside of the filter body support part, corresponding to the excluded regions that are cut out to receive the filter port support part.

5. The RF filter assembly of claim 2, wherein the filter body support part and the filter port support part separate the multiple RF filters at an identical height.

6. The RF filter assembly of claim 2, wherein the filter body support part comprises a one-side incision groove part and other-side incision groove part that are incised and formed from an end of an edge of the filter body support part on one side thereof and an end of an edge of the filter body support part on the other side thereof to a portion corresponding to the part of the filter body support part that is cut out to receive the filter port support part.

7. The RF filter assembly of claim 6, wherein the filter body support part comprises:

a support plate part attached to the one surface of the main board in a surface form;

an edge support stage bent from an end of an edge of the support plate part toward each of the multiple RF filters; and at least one inside support stage formed by bending a part of the support plate part corresponding to an inside of the edge support stage and configured to support opposing surfaces of each of the multiple RF filters.

8. The RF filter assembly of claim 7, wherein an outward appearance of the support plate part is formed in a shape corresponding to the outward appearance of the opposing surfaces of the multiple RF filters, with cut-out portions corresponding to the part of the filter body support part that is cut out to receive the filter port support part.

9. The RF filter assembly of claim 7, wherein the edge support stage is formed in a shape in which concave parts and convex parts are repeated along an end of an edge of the edge support stage.

10. The RF filter assembly of claim 7, wherein the at least one inside support stage comprises:

a first bent part that is formed by incising a part of the support plate part in a "⊏" shape and in which a portion connected to the support plate part is bent in a direction in which the multiple RF filters are provided, and a second bent part that is bent in parallel to opposing surfaces of the multiple RF filters from the end of the first bent part.

11. The RF filter assembly of claim 2, wherein:

the multiple RF filters are provided as ceramic waveguide filters, and the filter port support part is provided at a location corresponding to an input port hole to which an input port of the ceramic waveguide filter is connected and an output port hole to which an output port of the ceramic waveguide filter is connected.

12. The RF filter assembly of claim 2, wherein the multiple RF filters are provided as ceramic waveguide filters and are coupled by a solder at a contact point between each of the multiple RF filters and the filter body support part and the filter port support part.

* * * * *